United States Patent [19]

Zannis

[11] Patent Number: 4,906,924
[45] Date of Patent: Mar. 6, 1990

[54] LINEAR VARIABLE DISPLACEMENT TRANSDUCERS INCLUDING PHASE SHIFTING SERIES CONNECTED COILS

[75] Inventor: James Zannis, Gloucestershire, United Kingdom

[73] Assignee: Renishaw plc, England

[21] Appl. No.: 207,278

[22] PCT Filed: Nov. 4, 1987

[86] PCT No.: PCT/GB87/00780
§ 371 Date: Jun. 15, 1988
§ 102(e) Date: Jun. 15, 1988

[87] PCT Pub. No.: WO88/03640
PCT Pub. Date: May 19, 1988

[30] Foreign Application Priority Data

Nov. 4, 1986 [GB] United Kingdom ............... 8626270

[51] Int. Cl.$^4$ ............... G01B 7/14; G01B 7/30; G08C 19/06; H01F 21/00
[52] U.S. Cl. ............... 324/207.18; 324/207.24; 324/233; 336/45; 340/870.32
[58] Field of Search ............... 324/207, 208, 233, 234, 324/236, 173; 340/870.31, 870.32, 870.33, 870.35, 870.36; 336/45, 130, 136; 328/5; 307/515; 361/179, 180

[56] References Cited

U.S. PATENT DOCUMENTS

| 3,701,136 | 10/1972 | Stevens et al. | 340/870.35 |
| 3,721,896 | 3/1973 | Mori et al. | 324/234 X |
| 4,072,927 | 2/1978 | O'Neil | |
| 4,110,732 | 8/1978 | Jarocha et al. | |
| 4,112,365 | 9/1978 | Larson et al. | 324/173 |
| 4,405,896 | 9/1983 | Akita | 324/208 |
| 4,556,886 | 12/1985 | Shimizu et al. | 340/870.32 |
| 4,659,990 | 4/1987 | Torre | 324/233 X |
| 4,731,578 | 3/1988 | Tsaprazis | 324/236 X |
| 4,816,759 | 3/1989 | Ames et al. | 324/207 |

FOREIGN PATENT DOCUMENTS 0169633 1/1986 European Pat. Off. .
3205032 11/1982 Fed. Rep. of Germany .

OTHER PUBLICATIONS

"Linear Position Transducer Changes Phase Instead of Amplitude" by Frank Yeaple, Design News, Nov. 5, 1984, pp. 180–181.
"LVDT Interface Chip's Functional Blocks Offer Versatility" by Zahid Rahim, EDN, May 29, 1986, pp. 159–168.

Primary Examiner—Gerard R. Strecker
Attorney, Agent, or Firm—Oliff & Berridge

[57] ABSTRACT

A displacement transducer has a movable slug which varies the mutual inductance of two coil sections. The coil sections are connected in a network which causes a variation of phase shift in a signal from an oscillator on movement of the slug. A phase detector detects this phase shift. The use of a variable phase design overcomes the need for high gain linear amplification and the problem of noise in conventional variable amplitude linear variable displacement transducers. The variable phase shift network obviates the need for balanced amplitude quadrature input signals of one known variable phase transducer, while giving a linear phase shift wihtout the need for a specially shaped slug as in another known variable phase transducer.

11 Claims, 3 Drawing Sheets

LINEAR VARIABLE DISPLACEMENT TRANSDUCERS INCLUDING PHASE SHIFTING SERIES CONNECTED COILS

FIELD OF THE INVENTION

This invention relates to displacement transducers.

DESCRIPTION OF PRIOR ART

Linear variable displacement transducers (LVDT's) are well known and have numerous applications, including use in position-sensing probes for measuring work pieces on co-ordinate measuring machines and machine tools. A typical LVDT comprises three coils wound on a bobbin, and a movable slug within the bobbin. An oscialltor provides an excitation signal to one of the coils (the primary coil). The other two coils (the secondary coils) are connected in mutual opposition. The degree of coupling from the primary to the respective secondary coils depends on the position of the slug within the bobbin. The combined output of the secondary coils has an amplitude which is linearly variable with the displacement of the slug from a null position.

Whilst such arrangements are widely used, they do have disadvantages. Since the output from the secondary coils is amplitude modulated, it is necessary to process it linearly with relatively high gain in order to ensure a useful signal under all operating conditions. For the same reason, the output signal is relatively subject to noise.

An article "LVDT interface chip's functional blocks offer versatility" by Zahid Rahim, EDN, May 29th 1986, pages 159 to 168, both discloses a typical arrangement of the above type, and also describes a displacement transducer while uses a multiple coil arrangement in a variable phase circuit rather than a variable amplitude circuit. Such a circuit would minimise the above-noted disadvantages. In this arrangement, two primary coils are driven in quadrature, that is by sine and cosine signals. The sine and cosine signals are coupled to a secondary coil by the movable slug. Thus, the output of the secondary coil is the vector sum of the two iput signals, and the phase of this vector sum varies with the position of the slug. Being a phase modulated signal of constant amplitude, the output has relatively low susceptibility to the problem of noise and does not require such high gain amplification. Variable phase transducers using similar principles are described in U.S. Pat. No. 4,556,886 and in an article "Linear Position Transducer Changes Phase Instead of Amplitude" by Frank Yeaple, Design News, Nov. 5th, 1984, pages 180–181.

For such devices to work well, however, the two quadrature inputs need to be closely balanced. For example, if the amplitude of one of the inputs were to drift relative to the other, this would cause a phase change at the output, falsely indicating a movement of the slug. It would also obviously be desirable, if possible, to use a less complicated coil arrangement.

U.S. Pat. No. 4,112,365 and European Patent Application No. 169,633 show arrangements in which an oscillator drives a filter network containing a single coil and a capacitor. A movable coupling member varies the impedance of the coil in dependence on displacement, and thus causes a phase shift in the input signal from the oscillator. The phase shift can be detected to indicate displacement. However, the phase shift is non-linear with displacement, unless a specially shaped coupling member is used. Also, the filter network is just a simple resonant circuit, which means that as the coupling member is moved, the amplitude response of the network to the frequency of the oscillator varies appreciably.

SUMMARY OF THE INVENTION

The present invention provides a displacement transducer comprising an oscillator; a coil; an element movable in relation to the coil to vary the inductance of the coil; a network configured around the coil and having an input terminal connected to receive the output of the oscillator, the network being arranged to pass the frequency of the output of the oscillator but to give it a phase shift dependent on the position of the element;and means connected to an output terminal of the network for detecting the phase shift, characterised in that the network includes two coils or two sections of a coil, and movement of said element varies their mutual inductance, the two coils or two sections of a coil being connected in series between the inut terminal and the output terminal of the network.

BRIEF DESCRIPTION OF THE DRAWINGS

Preferred embodiments of the invention will now be described by way of example, with reference to the accompanying drawings, wherein.

DESCRIPTION OF PREFERRED EMBODIMENTS

Figure 1:
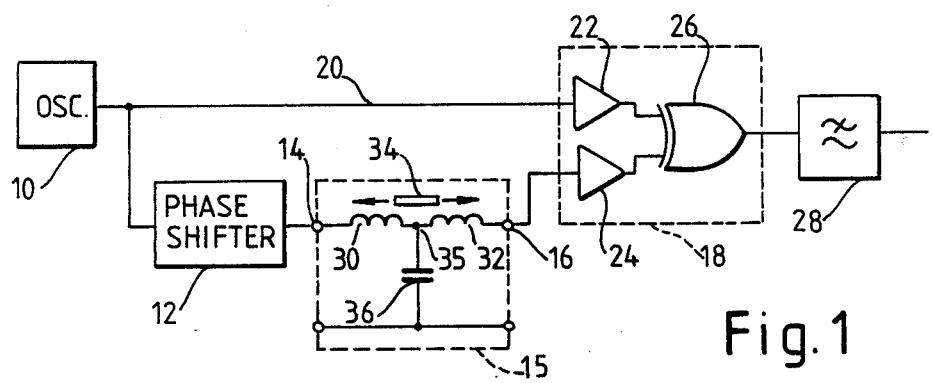
FIG. 1 is a schematic diagram of the electronic circuit of a transducer according to the invention.
Figure 10:
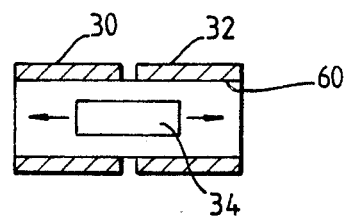

Referring to FIG. 1, an all-pass network 15 includes two coils 30,32 of a displacement transducer, connected in series. As seen in FIG. 10, the coils 30,32 are wound at adjacent positions on a bobbin 60. A movable slug 34 within the bobbin provides the mechanical input displacement of the transducer. Movement of the slug varies the mutual inductance of the coils.

Referring back to FIG. 1, the coils, 30,32 are in an all-pass filter configuration with a capacitor 36 connected between the common point 35 of the two coils 30,32 and ground. By definition an all-pass network is one which has a substantially constant amplitude response to all frequencies of interest, and a variation of phase shift with frequency. When driven by an appropriate constant frequency, however, the phase shift produced by the network 15 is a function of the inductance of the coils 30,32, which in turn is a function of displacement of the slug 34. The arrangement is such that when the slug 34 is in a null position, the inductance L of the coil 30 is equal to that of the coil 32. To provide a linear phase shift with displacement of the slug, the capacitance C of the capacitor 36 and the angular frequency W can be related by the formula $$W = \frac{1}{\sqrt{LC}} \qquad (1)$$

an oscillator 10 provides a sine wave output of angular frequency W, which after being shifted in phase by 90 degrees by a phase shifter 12, is taken to an input terminal 14 of the all-pass network 15, at the free end of the coil 30. The network 15 outputs a phase-shifted version of the input from an output terminal 16 at the free end of the coil 32. A phase detector 18 then detects the difference in phase between the signal from the output terminal 16 and the original output signal of the oscillator 10 (which is taken to the phase detector 18 on a line 20). The phase detector may of course have any of a number of different configurations, but FIG. 1 shows a schematic simplification of one possibility. The two input signals are squared up by respective limiters 22,24, comprising high gain amplifiers, and are then gated by an exclusive OR gate 26. When the transducer is in a null position, so that the network 15 introduces no phase shift itself, the two input signals from the terminal 16 and on the line 20 will be in quadrature because of the 90 degree phase shift introduced by the phase shifter 12, and the output of the gate 26 will be a square wave having a mark to space ratio of unity. If the slug 34 of the transducer is moved in a positive or negative direction from its null position, the phase shift at the output 16 will be respectively greater or less than 90 degrees, compared with the signal on line 20, and the mark to space ratio of the output of the gate 26 will accordingly be greater or less than unity. Thus, the mark to space ratio of the output of the gate 26 varies linearly with the displacement of the transducer. This output is now passed through a low-pass filter 28, to give a smooth DC output indicative of the position of the transducer.

It will be appreciated that the phase shifter 12 could equally be in the line 20 instead of in series with the all-pass network 15. Alternatively, it could be placed after the network 15 rather than before it. Furthermore, it will be appreciated that the function of this phase shifter 12 is solely to provide a quadrature signal necessary for the correct operation of the phase detector shown, and could be omitted if a different type of phase detector were employed.

Figure 2:
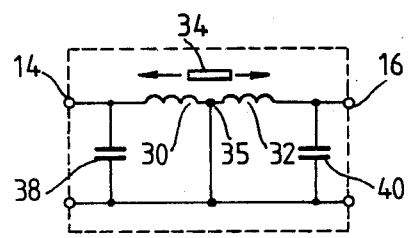
FIGS. 2, 3 and 4 show alternative networks for use in the circuit of FIG. 1.

The coil 30 and capacitor 36 in the network 15 present to the driving circuit an impedance which at the angular frequency given by formula (1) is simply the resistance of the wire used. Because of this relatively low impedance presented to the driving circuit, an alternative network may be preferred. FIG. 2 shows such an arrangement, the input of which appears as a high impedance. It will be seen that the common connection 35 of the two coils 30,32 is connected directly to ground, and two capacitors 38,40 are provided in parallel across the coils 30,32 respectively. The capacitances of the two capacitors 38,40 should preferably be equal, and should preferably fulfill the relationship of formula (1).

Figure 3:
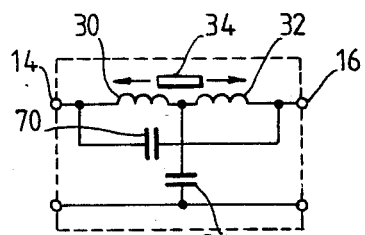
Figure 4:
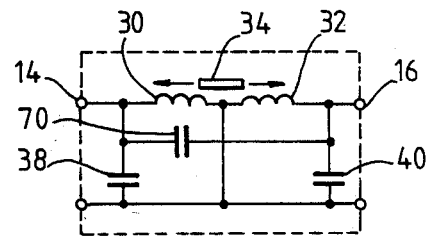

Many other all-pass networks could be used. FIGS. 3 and 4 show two examples, in which a capacitor 70 is placed in parallel with the coils 30,32 in the networks of FIGS. 1 and 2 respectively, between the input and the output of the network.

In place of the sine wave oscillator 10, a square wave oscillator could be used to simplify the signal generation.

Figure 5:
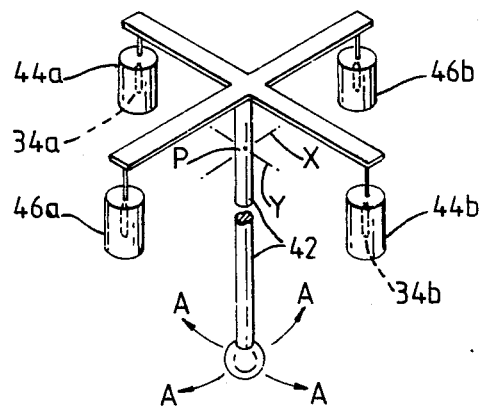
FIG. 5 illustrates diagrammatically the mechanical arrangement of a measurement probe.

With applications such as measuring probes, it is common to provide a symmetrical arrangement comprising a pair of displacement transducers. For example, FIG. 5 illustrates diagrammatically the mechanical arrangement of a measurement probe having a stylus 42 for contacting a workpiece. The stylus is mounted by a leaf spring (not shown) or by other means, so as to be pivotable about orthogonal axes X and Y at a point P. The tilting displacement which results, as indicated by arrows A, is to be measured. To measure the tilting about the X axis, two opposing displacement transducers 44a,44b are provided, each transducer having a movable slug 34a,34b and two coils (not detailed in FIG. 5) configured in the same manner as the coils 30,32 of FIG. 1 or FIG. 2. When the stylus 42 is displaced to one side, pivoting about the X axis, one of the slugs 34a,34b moves upwards in its transducer, while the other moves downwards. Depending on the configuration of the probe, these movments may not be equal and opposite, but it is required to measure the total displacement of one relative to the other.

Figure 6:
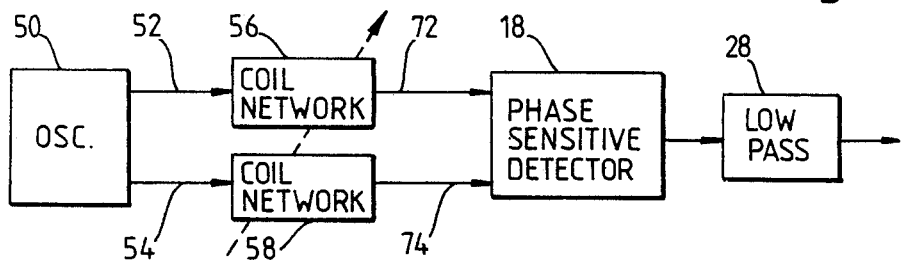
FIGS. 6 and 7 are schematic diagrams of electronic circuits for use with the arrangement of FIG. 5, FIGS. 8 and 9 show alternative networks for use in the circuit of FIG. 7, and FIGS. 10 to 13 show diagrammatically four alternative coil arrangements.

This may be done by a circuit as shown in FIG. 6. An oscillator 50 provides two outputs, on lines 52,54, in quadrature. These outputs are taken respectively to networks 56,58. The network 56 includes the coils of the transducer 44a, either in the configuration of the network 15 of FIG. 1, or in the configuration of FIG. 2. Similarly, the network 58 includes the coils of the transducer 44b. The mechanical arrangement is therefore such that a given displacement of the stylus 42 causes a positive phase shift to be produced by one of the networks 56,58, and a negative phase shift by the other. The outputs 72,74 of the networks 56,58 are taken to a phase sensitive detector 18, which could be the same as the phase sensitive detector 18 in FIG. 1. The output of this phase sensitive detector 18 is smoothed in the same manner of FIG. 1 by a low pass filter 28, giving a DC output signal which is linearly dependent on the differential phase shift of the two networks, and hence on the displacement of the stylus 42.

Tilting of the stylus 42 about the Y axis is detected by an identical circuit, using transducers 46a,46b. If desired, translation in the vertical or Z direction can be detected by a further, similar circuit in which the connections to the coils 30,32 in one of the networks 56,58 are reversed.

Figure 7:
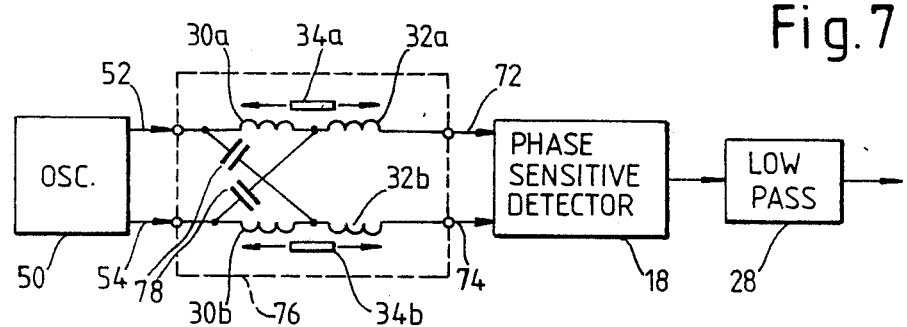

FIG. 7 shows an alternative to FIG. 6, in which the two differentially-operating networks 56,58 are replaced by one differential network 76. The transducer 44a of FIG. 5 includes two coils 30a,32a, whilst the transducer 44b includes two coils 30b, 32b. To give a phase-sensitive, all-pass configuration, the coils 30a,30b are cross-coupled by capacitors 78. As previously, the slug 34a associated with the coils 30a,30b is mechanically coupled to the corresponding slug 34b of the coils 30b,32b, so that the two slugs move in opposing senses and thus cause opposing phase shifts on the outputs 72,74 of the network.

Figure 8:
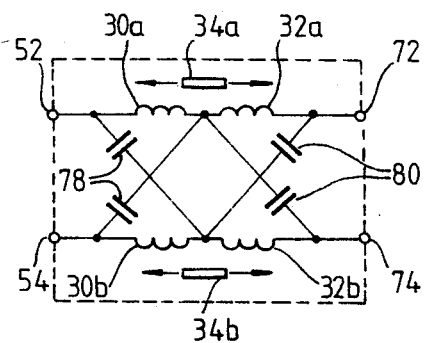
Figure 9:
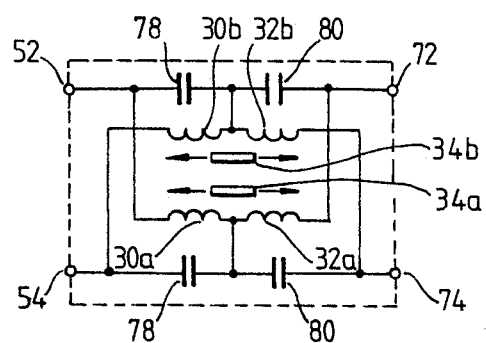

FIG. 8 shows a further development of the network 76, in which the coils 32a,32b are cross-coupled by capacitors 80. FIG. 9 shows an inverse arrangement, in which the positions of the coils and the capacitors within the network are swapped over.

It will be seen that although the circuits described in FIGS. 1, 6 and 7 use input signals in quadrature, they do not have to be balanced amplitude quadrature signals in the same way as in some of the prior art linear phase transducers. This is because the amplitude of the two input signals is of no consequence. Furthermore, the phase modulated arrangements described are much less susceptible to noise than the known amplitude modulated arrangements, since all the relevant information lies in the zero crossings of the signals and not in their amplitudes. There is no need for the provision of high gain linear amplifiers, and so the cost and complication of the circuit is much reduced, compared with amplitude modulated arrangements. Because of the simplicity of the circuit, in fact, it now becomes feasible to build all the components of the circuit within the body of a measurement probe, rather than providing them in a separate interface, and this in turn simplifies the problems of transmission of the output signal of the probe to external equipment.

Moreover, the circuits described give a linear phase shift with displacement, without the need for specially shaped movable elements as in other known phase-sensitive transducers. Also, compared with these other known phase-sensitive transducers, the phase shift networks described have a more constant amplitude response, so minimising possible phase errors which might be caused in the detector 18 by amplitude variations.

Figure 11:
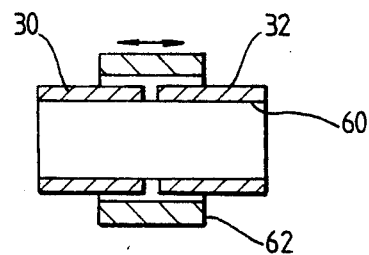

The coil/slug arrangement shown in FIG. 10 is not the only possible arrangement. FIG. 11 shows an alternative, in which a co-axial sleeve 62 around the coils 30,32 is movable to provide the input displacement, in place of the slug 34. The sleeve 62 is made of either a ferrous material, or a conductive material in which eddy currents are induced by the coils. The mutual inductance of the coils varies in the same manner as previously when the sleeve is moved.

Figure 12:
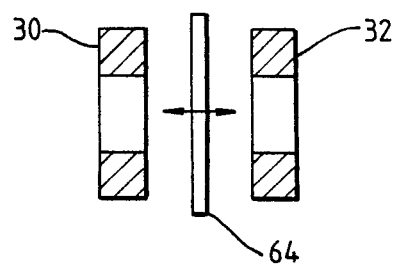

Another alternative is shown in FIG. 12. Here, a conductive plate 64 is provided between the two coils 30,32. To provide the input displacement, the plate 64 is movable towards one coil and away from the other, and vice versa. Again, eddy current induced in the plate affect the mutual inductance of the coils.

Figure 13:
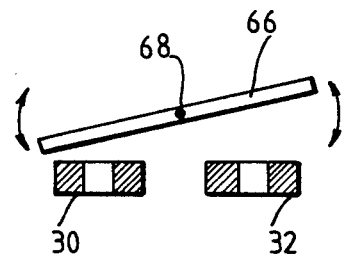

A further alternative is shown in FIG. 13. Here, the two coils 30,32 are side-by-side, and a conductive plate 66 is pivotable at 68. Pivoting of the plate 66 causes one side of the plate to move towards the coil 30 and the other side away from the coil 32, and vice versa. Once again, this varies the mutual inductance of the coils.

The embodiments described can be used in a wide variety of applications, including measurement probes of the type shown in FIG. 5, and also probes designed for the inspection of the surface finish of a workpiece, in which a fine stylus reacts to features of the roughness of the surface.

I claim:

1. A displacement transducer comprising:
   oscillator means for producing an oscillating signal;
   transducer network means for phase shifting the signal comprising: input means for receiving the signal, output means for passing the signal from the network, inductance means, a movable element, the inductance means comprising two coils connected in series between the input means and the output means of the network and the movable element being positioned so that movement thereof varies the mutual inductance of the coils, whereby the signal is phase shifted in proportion to displacement of the movable element from a null position; and
   detector means connected to the output means of the transducer network for detecting phase shifting of the signal imparted by the transducer network.

2. A displacement transducer according to claim 1, wherein the transducer network constitutes an all-pass filter.

3. A displacement transducer according to claim 1, wherein the transducer network includes a capacitor connected at a common point between the two coils and ground.

4. A displacement transducer according to claim 1, wherein a common point of the two coils is connected to ground, and the transducer network includes a capacitor connected in parallel with each coil.

5. A displacement transducer according to claim 3, wherein the inductance L of each coil when said movable element is in a null position is related to the capacitance C of each associated capacitor and the angular frequency W of the oscillator by the formula $$W = \frac{1}{\sqrt{LC}}.$$

6. A displacement transducer according to claim 1, wherein the means for detecting the phase shift detects the difference in phase between the output signal of the transducer network and the output signal of the oscillator means.

7. A displacement transducer as in claim 1 and further comprising a second transducer network means for shifting the phase of the signal opposite to the phase shift of the first transducer network means including input means for receiving the signal, output means for passing the signal from the network, inductance means, a movable element, the inductance means comprising two coils connected in series between the input means and the output means and the movable element being positioned to vary the mutual inductance of the coils in proportion to displacement of the movable element from null positions.

8. A displacement transducer according to claim 7, wherein the means for detecting the phase shift is connected to receive the outputs of the two networks and detect the phase difference between them.

9. A displacement transducer according to claim 1, wherein the network means includes two inductance means in a differential arrangement, each inductance means comprising two coils and movable element, the network producing two outputs phase shifted in opposite senses.

10. A displacement transducer according to claim 9, wherein the means for detecting the phase shift includes means for receiving said two outputs and detecting the phase difference between them.

11. A displacement transducer comprising:
    oscillator means for producing an oscillating signal of constant frequency;
    a transducer network comprising an all pass filter means for phase shifting the signal, the network having means for receiving the oscillating signal, output means and an inductance means comprising two coils and a movable element for varying the mutual inductance of the coils, whereby displacement of the movable element from a null position shifts the phase of the signal in proportion to the displacement of the movable element; and
    detector means for receiving the output signal of the filter means and means for detecting the phase shift in the signal imparted by the filter.

* * * * *